J. P. FEENEY.
DYNAMO ELECTRIC MACHINE.
APPLICATION FILED APR. 6, 1908.
964,630.
Patented July 19, 1910.
2 SHEETS—SHEET 1.
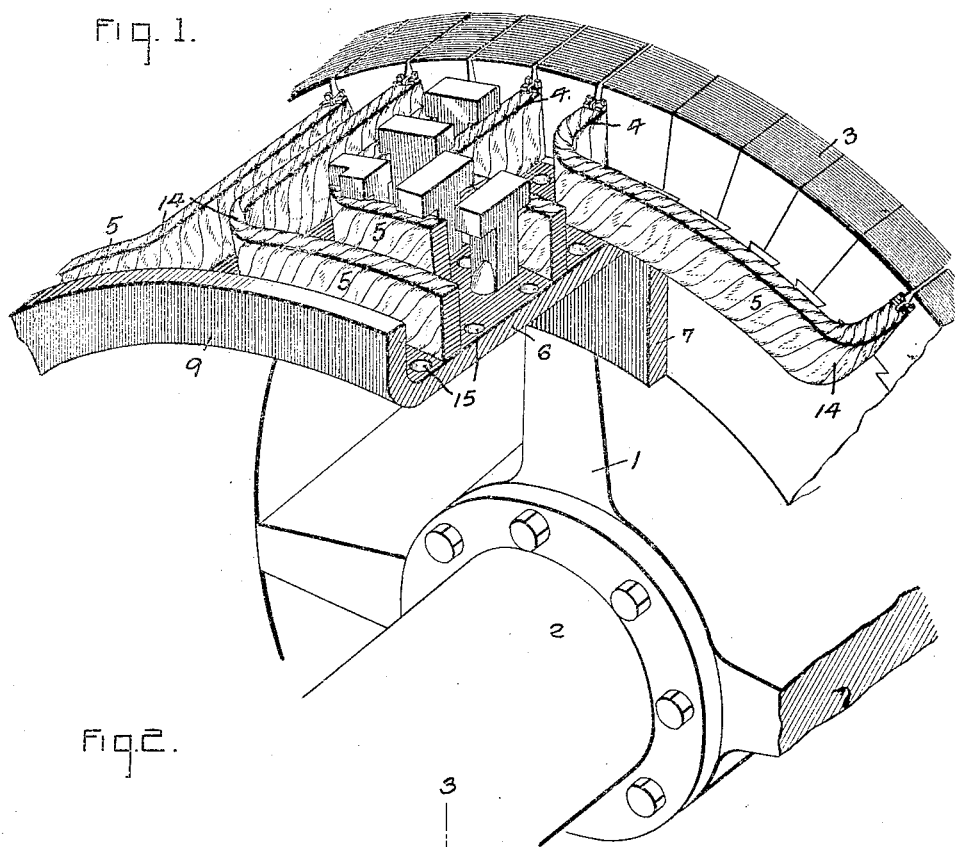
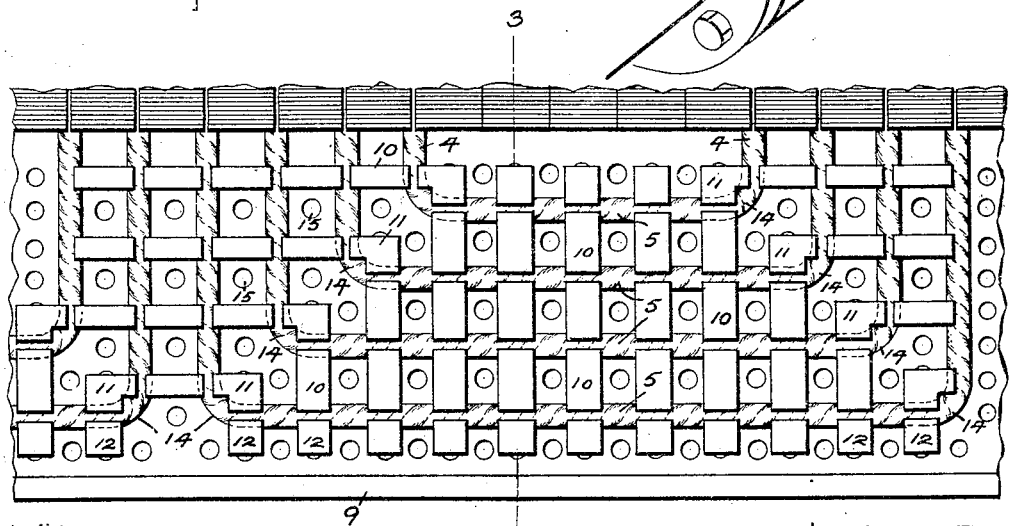
WITNESSES:
INVENTOR.
JOSEPH P. FEENEY.
by
ATT'Y.

J. P. FEENEY.
DYNAMO ELECTRIC MACHINE.
APPLICATION FILED APR. 6, 1908.

964,630.

Patented July 19, 1910.

2 SHEETS—SHEET 2.

WITNESSES:
W. Ray Taylor.
J. Ellis Glenn

INVENTOR
JOSEPH P. FEENEY by Albert H. Davis
ATTY.

UNITED STATES PATENT OFFICE.

JOSEPH P. FEENEY, OF SCHENECTADY, NEW YORK, ASSIGNOR TO GENERAL ELECTRIC COMPANY, A CORPORATION OF NEW YORK.

DYNAMO-ELECTRIC MACHINE.

964,630.  Specification of Letters Patent.  Patented July 19, 1910.

Application filed April 6, 1908. Serial No. 425,395.

*To all whom it may concern:*

Be it known that I, JOSEPH P. FEENEY, a citizen of the United States, residing at Schenectady, county of Schenectady, State of New York, have invented certain new and useful Improvements in Dynamo-Electric Machines, of which the following is a specification.

My invention relates to dynamo-electric machines and more particularly to means for supporting the end turns or connections which extend beyond the cores of the rotors of such machines, and has for its object a simple arrangement whereby such end turns may be rigidly secured in place against the action of centrifugal force and at the same time are well ventilated.

Heretofore in constructing the supports for end turns of the rotors of high speed dynamo-electric machines it has been found necessary to hold the end turns between plates or rings of metal. These rings form pockets preventing circulation of air past the coils so that the heat generated in the coils is retained. By employing supports according to my invention the end turns are efficiently ventilated and no such pockets are formed. To this end, I provide a plurality of members for each of said end turns arranged in a row, each having one or more overhanging portions, each of said overhanging portions engaging the exterior surface of a single end turn, and a single stem portion which passes between the coils, these members being suitably spaced apart and securely held in place against centrifugal force.

Other features of novelty which characterize my invention are pointed out with particularity in the claims annexed to and forming a part of this specification. For a better understanding of my invention, however, reference may be had to the following description taken in connection with the accompanying drawing, in which—

Figure 3:
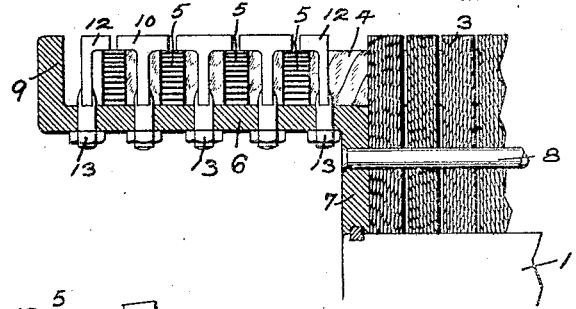
Figure 4:
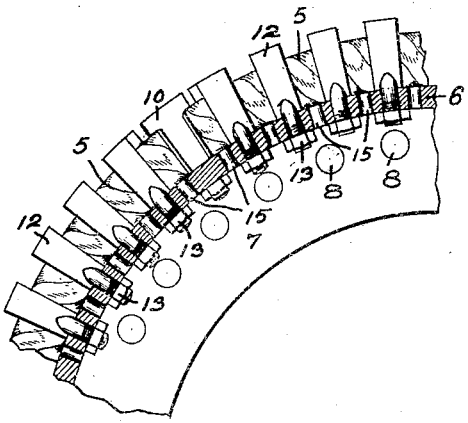

Figure 1 is a perspective view of a rotor of a dynamo-electric machine embodying my invention with some of the parts removed and cut away; Fig. 2 is a plan view of the end turns; Fig. 3 is a section on the line 3—3 of Fig. 2; Fig. 4 is an elevation showing the supporting means for the outside end turns, and Fig. 5 is a sectional view of a modification.

The spider 1 is mounted upon the shaft 2 and supports the laminations 3. The coils 4 are embedded in slots in the laminations and have the end turns or connections 5. These parts may assume any usual or preferred form.

Referring particularly to Figs. 1 to 4 inclusive, 6 is a member upon which the end turns are supported. The ring member 6 has a flanged portion 7 which is supported in any suitable manner, and preferably is riveted to the laminations by means of rivets 8. The outer end of this member 6 is upturned to form a flange 9 which protects the end turns from injury. This flange 9, however, may be dispensed with each of the supporting members 10, 11 and 12 have one or more overhanging portions each of which portions engages the exterior surface of a single end turn or connection of the coils, and a single threaded stem portion which extends through the member 6. The supporting members for each end turn are arranged in a row. Bolts 13 hold these members in place and clamp the end connections against the ring member 6. The members 10, 11 and 12 are suitably spaced apart. The overhanging portions of the member 10 engage the exterior surfaces of two adjacent coils, and consequently these members are T-shaped. The members 11 engage the corners 14 of each end turn. The members 12 are L-shaped, the overhanging portions of which engage the extreme outer and inner end turns. Holes 15 are provided in the flanged member 6 for the purpose of ventilation.

Figure 5:
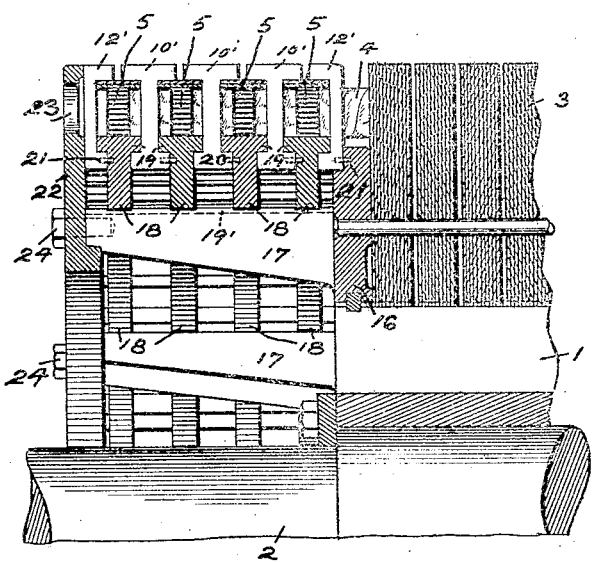

In the modification shown in Fig. 5, the end member 16 carries arms 17 upon which are mounted rings 18 having flanged portions 19. The arms 17 and rings 18 are keyed together by means of keys 19' to prevent the rings 18 from rotating relative to the arms. Each of the members 10', 11' and 12', similar to the members 10, 11 and 12, have one or more overhanging portions each of which portions engages the exterior surface of a single turn of the coils. These members have flanged portions 20, which interlock with the flanged portions 19 on the rings, and are held in place thereby, clamping the end turns against the rings 18. Dowel pins 21 may be provided to properly space the supporting members apart and to keep them from moving when properly spaced. By thus spacing apart the supporting means for the end turns, passages are provided so that air may pass between these members and the rings 18 and thereby keep the end turns cool. An end ring 22 provided with ventilating holes 23 is fastened to the arms 17 by means of bolts 24. This end ring presses against the members 12', which engage the outer end turns, and thereby holds the entire supporting means rigidly in place. In this construction the end member 16, the arms 17 and rings 18 mounted thereon, are, to all intents and purposes, the same as the single flanged ring member 6 shown in Figs. 1 to 4 inclusive.

I desire it to be understood that my invention is not limited to the particular construction shown and described, and I aim in the appended claims to cover all modifications which do not depart from the spirit of my invention.

What I claim as new, and desire to secure by Letters Patent of the United States, is,—

1. In a dynamo electric machine, a rotatable member, coils therefor having end turns or connections, and supporting means for each of said end turns comprising a plurality of members arranged in a row, each of said members having one or more flanged portions, each of said flanged portions engaging the exterior surface of a single end turn, and a single stem portion passing between the end turns, said members being spaced apart, and means for holding said members in place against centrifugal force.

2. In a dynamo electric machine, a rotatable member, a ring member fastened thereto, coils therefor having end turns or connections supported on said ring member, and means for holding each of said end turns in place against centrifugal force comprising a plurality of members arranged in a row, each of said members having one or more flanged portions, each of said flanged portions engaging the exterior surface of a single end turn, and a single stem portion passing between the end turns, said members being spaced apart, and means for fastening said stem portions to said ring member.

3. In a dynamo electric machine, a rotatable member, a ring member having ventilating passages therein and a flange, means for fastening said flange to said rotatable member, coils having end turns or connections supported on said ring member, and means for holding each of said end turns in place against centrifugal force comprising a plurality of members arranged in a row, each of said members having a flanged portion, each of said flanged portions engaging the exterior surface of a single end turn, and a single stem portion passing between the end turns and fastened to said ring member, said members being spaced apart.

4. In a dynamo electric machine, a rotatable member, coils therefor having end turns or connections, a support for said end turns, and means for holding each of said end turns in place against centrifugal force comprising a plurality of members arranged in a row, each of said members having one or more flanged portions, each of said flanged portions engaging the exterior surface of a single end turn, and a single stem portion passing between the end turns and secured to said support, said members being spaced apart about said support.

In witness whereof I have hereunto set my hand this 2nd day of April 1908.

JOSEPH P. FEENEY.

Witnesses:
EDWIN L. RICH,
HELEN ORFORD.